United States Patent Office 3,304,546
Patented Feb. 14, 1967

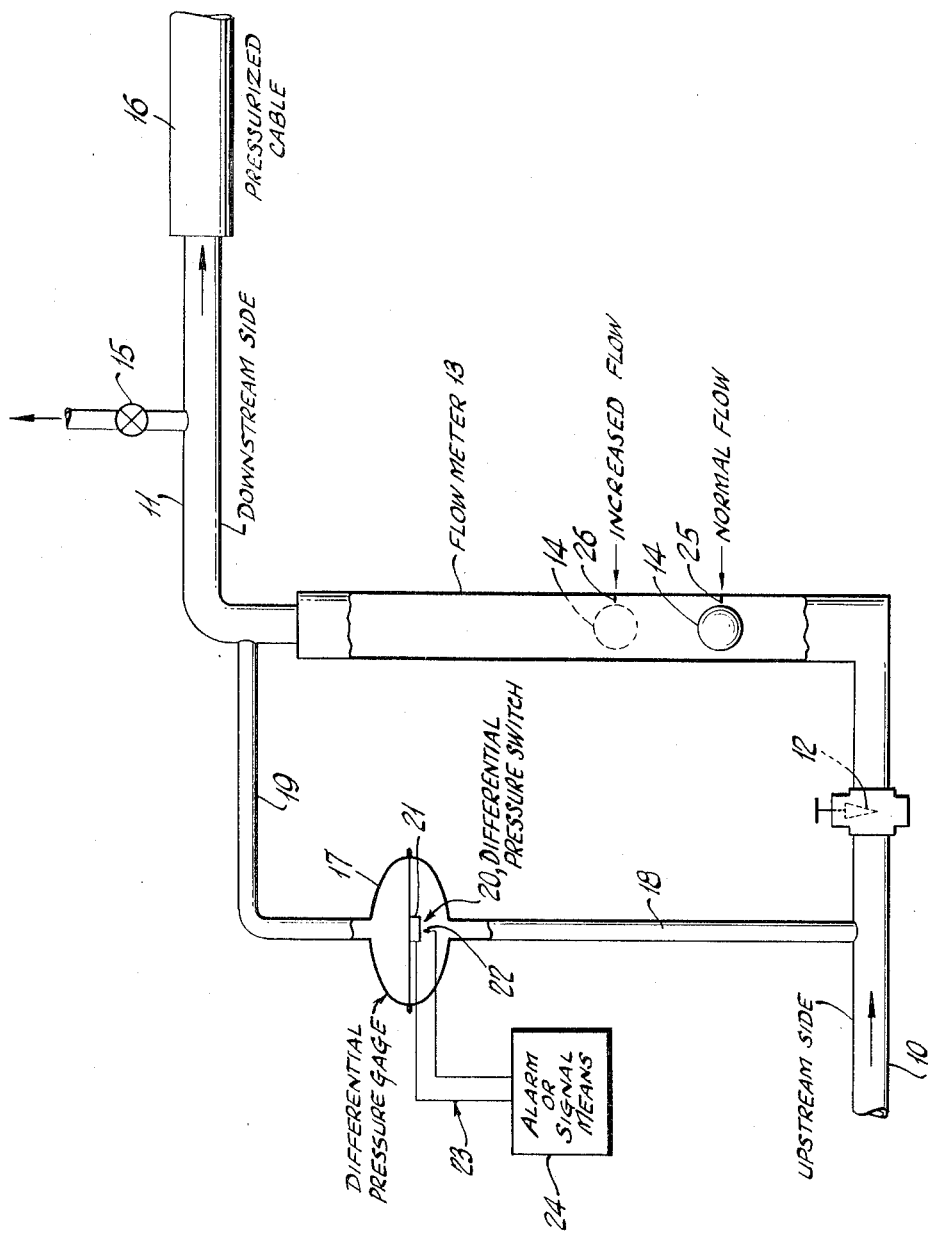

3,304,546
LEAK DETECTOR FOR PRESSURIZED CABLE
Joseph F. Kern, Massapequa, and Walter A. Siebein, Smithtown, N.Y., assignors to Puregas Equipment Corp., Copiague, N.Y.
Filed Nov. 16, 1964, Ser. No. 411,374
8 Claims. (Cl. 340—242)

This invention relates to a cable pressurizing system for coaxial cables of the conventional pressurized type where it is desired to maintain the pressure of the fluid, such as air, constant within the cable in order to minimize any variation in electrical characteristics of the cable. In its broad aspects, the invention relates to a leak detecting apparatus and method for use with fluid flow systems in which leaks are apt to occur on the downstream side of the system.

In a cable pressurization system or other fluid pipeline it is desirable to know when the air or fluid flow exceeds a known or preset increment over a known established flow. In cable pressurization systems, an increase in air flow generally indicates an air leak in the cable system which must be repaired. As it is important that the flow of gas, such as air, be maintained constant in such a system, it would be desirable that the system have associated with it means for signaling when leakage occurs which adversely affects the flow of air through the system.

It is an object of the invention to provide a method for detecting leakage in a cable pressurization system or other fluid pipeline.

Another object is to provide a leak detecting apparatus or device for use with fluid flow systems, such as, for example, cable pressurization systems and the like.

These and other objects will more clearly appear when taken in conjunction with the following disclosure and the accompanying drawing which is illustrative of a preferred embodiment of the invention, it being understood that variations and modifications of the apparatus and methods may be employed without departing from the spirit and scope of the invention.

In applying the invention to a fluid flow system having a valve with an adjustable orifice coupled between the upstream and downstream sides of the system with the valve adjusted to provide a desired downstream flow rate of fluid, the method in its broad aspects comprises, continuously sensing the pressure differential across the upstream and downstream sides of the system and determining via a signal the onset of an undesirable leak rate when the sensed pressure differential exhibits a value corresponding to the undesirable leak rate.

The system may be standardized to sense a particular undesirable leak rate by first simulating an undesirable leak rate on the downstream side of the system and then setting the instruments in the line accordingly so that when an actual undesirable leakage occurs in the system, it can be easily detected by reference to a standard.

For example, assuming air is the fluid flowing in the system, the fluid is passed through a flow measuring flow meter which indicates the fluid flow. Downstream of the flow meter is placed a bleed-off valve which can be opened to simulate a desired leakage of fluid to the atmosphere. The fluid leakage is indicated on the flow meter as part of an increased total fluid flow. An indicating mark is made at the increased flow. The valve (adjustable orifice) upstream of the flow meter is slowly closed until a pressure drop is observed across the valve (adjustable orifice) and flow meter. This pressure drop is sensed by a differential pressure switch, or differential flow manometer, which responds to a difference in pressure on both sides of the valve (adjustable orifice) and flow meter. When the differential pressure switch closes (or opens) the orifice is set. The orifice can also be set by closing the adjustable orifice until a specific differential pressure reading on a differential flow manometer is obtained. The bleed-off valve is then closed. The flow returns to its normal condition and the differential pressure switch opens (or closes). An indicating mark is made at the normal flow.

Any flow change can be readily observed on the flow meter using the normal flow reference mark. When the flow increases to the alarm point, the differential pressure switch closes. Alternatively, if a differential flow manometer is used, the change in differential pressure as a result of the change in flow will be indicated thereon. Any flow increase causes an increase in the differential pressure across the adjustable orifice.

The flow meter may be calibrated in the units used for a particular application such as, standard cubic feet per day for cable pressurization. Therefore, any change in flow can be set by first bleeding to atmosphere the desired flow increment and second by decreasing the size of the adjustable orifice.

To change the sensitivity of the alarm circuit an adjustable differential pressure switch could be used.

Several differential pressure switches could be installed across the adjustable orifice to cause alarms or signals at several flow increments or pressure differential increments.

Referring now to the drawing, a fluid flow system is shown for use, for example, with a pressurized cable 16 comprising upstream side 10 and downstream side 11 with a valve 12 having an adjustable orifice (e.g. a needle valve) and a flow meter 13 series connected between said upstream and downstream sides. The flow meter is the usual conventional type and has a movable indicator 14 for indicating the amount of flow, depending upon the units of measure on the face of the meter. Bleed-off means 15 (e.g. a valve) is provided on the downstream side of the system for use in simulating a leak rate in standardizing the instruments for a particular leak rate.

Across the upstream and downstream sides 10 and 11 of the fluid flow system, a differential pressure gage 17 of the diaphragm type is coupled via pipelines 18 and 19, it being understood that other types of differential pressure gages may be employed. The gage 17 has in combination therewith a differential pressure switch 20 which may be a microswitch having contacts 21 and 22 coupled to a circuit referred to generally by the numeral 23, the circuit including an alarm or signal means 24.

In standardizing the system for detecting undesirable leaks, the following procedures may be employed:

Fluid is passed through flow meter 13 to indicate a normal flow rate as shown by mark 25. Bleed-off valve 15 is then opened to cause an amount of leakage corresponding to an undesirable leak rate. The indicator 14 moves up to a higher position on the meter corresponding to an increased total flow. An indicating mark 26 is made at the increased flow level. The valve 12 is slowly closed until a pressure drop is observed across the upstream and downstream sides of the fluid flow system via differential pressure gage 17. The pressure drop is sensed by the gage and switch 20 is either opened or closed, depending upon the pre-set condition of the switch. When the switch opens or closes at this point, the orifice of valve 12 is deemed to be set. The bleed-off valve is closed and the system then considered ready for normal conditions, while being adjusted to detect an undesirable leak rate.

Assuming air is involved and the pressure at the upstream side is 10 p.s.i.g. (pounds per square inch gage) for a flow meter range of from about 100 to 1500 standard cubic feet per day, the normal differential pressure across the upstream and downstream sides of the system where there is no leakage may range up to 5 inches of water. On the other hand, an undesirable leak rate in the system might result in a differential pressure of, let us say, 10 inches of water. The differential pressure switch 20 would be set to operate at the aforementioned pressure drop, whereby the switch would either open or close, depending upon its preset condition and actuate alarm 24 accordingly.

Another procedure of setting up the detecting system is to close the adjustable orifice while the bleed-off valve is open until a specific differential pressure is obtained on the gage, be it of the diaphragm type or a differential flow manometer or other gages. The bleed-off valve is then closed, whereby the flow returns to its normal condition and the differential pressure switch opens or closes. An indicating mark 25 is made corresponding to normal flow which may then be used as a normal flow reference mark. When the flow increases to the alarm point, the differential pressure switch is actuated. As stated hereinbefore, if a differential flow manometer is used, the change in differential pressure as a result of the change in flow will be indicated thereon to signal the onset of an undesirable leak rate. The alarm or signal might be a sound, such as made by a bell or buzzer, a light, or an accentuated reading on the gage readily observable.

While the foregoing description is directed to a cable pressurization system, it will be appreciated that the invention may be applied to any pneumatic or hydraulic line.

According to the present state of the art, flow sensitive switches are expensive and do not provide the sensitivity of control as the invention described above. The existing devices utilize either flow meters only, or fixed orifices for a particular flow. The invention, on the other hand, provides sensitive control for an infinite flow range by means of the adjustable orifice. It will be appreciated by those skilled in the art that for a particular flow, the orifice is fixed. By means of the bleed-off valve and the flow meter, a known pre-set flow increment can be set into the system. Therefore, the flow increment can be set by flow and not the pressure differential. No conversion from flow units to pressure units is necessary.

Although pipeline 19 of the differential pressure switch 17 is shown on the downstream side of the flowmeter 13, it is apparent that it could be coupled to the downstream side of the valve 12 before the flowmeter 13.

While the foregoing description sets forth the principles of the invention in connection with specific apparatus, it is to understood that this description is made only by way of example and not as a limitation of the scope of the invention as set forth in the objects thereof and in the accompanying claims.

What is claimed is:

1. In a fluid flow system having an orifice coupled between the upstream and downstream sides of the system, a leak detecting apparatus comprising a differential pressure gage coupled across the upstream and downstream sides of said orifice, leak-simulating bleed-off means on the downstream side for adjustably indexing said differential pressure gage to sense a differential pressure corresponding to an undesirable leak on said downstream side, and signal means actuated by said differential pressure gage for indicating when an undesirable leak rate is sensed by said indexed differential pressure gage.

2. The leak detecting apparatus of claim 1 wherein said orifice has means for adjusting the effective size thereof.

3. In a fluid flow system having an orifice coupled between the upstream and downstream sides of the system, a leak detecting apparatus comprising a differential pressure gage coupled across the upstream and downstream sides of said orifice, leak-simulating bleed-off means on the downstream side for adjustably indexing said differential gage to sense a differential pressure corresponding to an undesirable leak rate on said downstream side, switch actuating means coupled to said differential pressure gage and actuated by said gage, and a circuit including signal means coupled to said switch actuating means, said switch actuating means being adjusted to activate said signal means when an undesirable leak rate is sensed by said differential pressure gage.

4. The leak detecting apparatus of claim 3 wherein said orifice has means for adjusting the effective size thereof.

5. In a pressurized cable system wherein a fluid flow system is employed to pass fluid on the downstream side through a cable at a specified pressure and humidity to minimize any variation in electrical characteristics of the cable, said fluid flow system having an orifice coupled between the upstream and downstream sides of the system, a leak detecting apparatus comprising a differential pressure gage coupled across the upstream and downstream sides of said orifice, leak-simulating bleed-off means on the downstream side for adjustably indexing said differential pressure gage to sense a differential pressure corresponding to an undesirable leak on said downstream side, and signal means actuated by said differential pressure gage for indicating when an undesirable leak rate is sensed by said differential pressure gage.

6. The leak detecting apparatus of claim 5 wherein the orifice has means for adjusting the effective size thereof.

7. In a pressurized cable system wherein a fluid flow system is employed to pass fluid on the downstream side through a cable at a specified pressure and humidity to minimize any variation in electrical characteristics of the cable, said fluid flow system having an orifice coupled between the upstream and downstream sides of the system, a leak detecting apparatus comprising a differential pressure gage coupled across the upstream and downstream sides of said orifice, leak-simulating bleed-off means on the downstream side for adjustably indexing said differential gage to sense a differential pressure corresponding to an undesirable leak rate on said downstream side, switch actuating means coupled to said differential gage and actuated by said gage, and a circuit including signal means coupled to said switch actuating means, said switch actuating means being adjusted to activate said signal means when an undesirable leak rate is sensed by said indexed differential pressure gage.

8. The leak detecting apparatus of claim 7 wherein said orifice has means for adjusting the effective size thereof.

References Cited by the Examiner

UNITED STATES PATENTS

| | | | |
|---|---|---|---|
| 882,141 | 3/1908 | Cope | 73—40.5 |
| 1,023,739 | 4/1912 | Joyce | 73—3 |
| 2,438,441 | 3/1948 | Hollingsworth | 117—311 |
| 2,788,658 | 4/1957 | Liden et al. | 73—40.5 |
| 2,808,580 | 10/1957 | Fuller | 340—239 |
| 2,809,248 | 10/1957 | Frakes | 200—81.9 |
| 3,041,834 | 7/1962 | Davies et al. | 60—39.09 |
| 3,225,340 | 12/1965 | Kochey et al. | 340—239 |

FOREIGN PATENTS 800,005   10/1958   Great Britain.

LOUIS R. PRINCE, *Primary Examiner.*

S. C. SWISHER, *Assistant Examiner.*